US011773623B2

(12) United States Patent
Aguilar Ante et al.

(10) Patent No.: US 11,773,623 B2
(45) Date of Patent: Oct. 3, 2023

(54) SYSTEMS AND METHODS FOR HIGH VISIBILITY LATCH HANDLE

(71) Applicant: ROHR, INC., Chula Vista, CA (US)

(72) Inventors: Jose Roberto Aguilar Ante, Mexicali (MX); Jaime Francisco Salazar Ibarra, Mexicali (MX)

(73) Assignee: ROHR, INC., Chula Vista, CA (US)

( * ) Notice: Subject to any disclaimer, the term of this patent is extended or adjusted under 35 U.S.C. 154(b) by 156 days.

(21) Appl. No.: 17/220,442

(22) Filed: Apr. 1, 2021

(65) Prior Publication Data

US 2021/0348419 A1  Nov. 11, 2021

Related U.S. Application Data

(60) Provisional application No. 63/020,404, filed on May 5, 2020.

(51) Int. Cl.
*E05B 41/00* (2006.01)
*B64D 29/06* (2006.01)
*E05B 15/00* (2006.01)

(52) U.S. Cl.
CPC .............. *E05B 41/00* (2013.01); *B64D 29/06* (2013.01); *E05B 15/0086* (2013.01); *E05Y 2900/502* (2013.01); *F05B 2240/14* (2013.01)

(58) Field of Classification Search
CPC ... B64D 29/06; E05B 1/0084; E05B 15/0086; E05B 63/0056; E05B 85/103; E05B 41/00; E05C 19/14; E05C 19/145; B60R 13/005; B65D 25/20; B65D 25/205; Y10S 70/59; Y10T 70/8027; E05Y 2900/502
See application file for complete search history.

(56) References Cited

U.S. PATENT DOCUMENTS

| 7,454,933 B1 * | 11/2008 | Paige .................... E05B 5/003 |
| | | 292/DIG. 31 |
| 7,802,826 B2 | 9/2010 | Schmitz et al. |
| 8,317,237 B1 | 11/2012 | Fannon et al. |
| 9,624,693 B2 | 4/2017 | Vandewall et al. |

(Continued)

FOREIGN PATENT DOCUMENTS

| EP | 2955305 A1 | 12/2015 |
| EP | 3656677 A1 | 5/2020 |
| WO | 2017127776 A2 | 7/2017 |

OTHER PUBLICATIONS

European Patent Office, European Search Report dated Oct. 1, 2021 in Application No. 21172341.6.

*Primary Examiner* — Kristina R Fulton
*Assistant Examiner* — Emily G. Brown
(74) *Attorney, Agent, or Firm* — SNELL & WILMER L.L.P.

(57) ABSTRACT

A latch handle arrangement includes a latch handle body and a removable insert. The latch handle body comprises a first sidewall, a second sidewall, and a transverse wall extending from the first sidewall to the second sidewall. The latch handle body further comprises one or more apertures disposed in the latch handle body. The removable insert is configured to be coupled to the latch handle body. The removable insert comprises an insert body and one or more bosses protruding from the insert body into the respective apertures disposed in the latch handle body, wherein the boss(es) are visible from an external surface of the latch handle body.

18 Claims, 9 Drawing Sheets

(56) References Cited

U.S. PATENT DOCUMENTS

| | | |
|---|---|---|
| 9,701,413 B2 | 7/2017 | Provost et al. |
| 9,945,150 B2 | 4/2018 | Aten et al. |
| 10,267,060 B2 | 4/2019 | Frommer et al. |
| 2006/0214431 A1* | 9/2006 | Helsley .................. B64D 29/06 |
| | | 292/113 |
| 2011/0227350 A1* | 9/2011 | Do ........................ E05C 19/145 |
| | | 292/105 |
| 2014/0054905 A1* | 2/2014 | Brandt ................. B65D 45/345 |
| | | 292/256.69 |
| 2015/0259957 A1* | 9/2015 | Hernandez ............ E05C 19/145 |
| | | 292/97 |
| 2016/0280384 A1* | 9/2016 | Aten ........................ E05B 1/00 |
| 2020/0031484 A1 | 1/2020 | Thomas et al. |
| 2020/0332555 A1* | 10/2020 | Sutter .................... E05B 41/00 |

\* cited by examiner

SYSTEMS AND METHODS FOR HIGH VISIBILITY LATCH HANDLE

CROSS REFERENCE TO RELATED APPLICATIONS

This application claims priority to and the benefit of U.S. Patent Application No. 63/020,404 filed May 5, 2020 and entitled "SYSTEMS AND METHODS FOR HIGH VISIBILITY LATCH HANDLE," which is hereby incorporated by reference in its entirety for all purposes.

FIELD

The present disclosure relates to latch handles capable of being used in an aircraft.

BACKGROUND

Latch handles are commonly used in the nacelle of an aircraft, for example, in fan cowls. Fan cowls are hinged to the pylon or to a frame structure attached at the top of the nacelle. Fan cowls enclose the engine fan case and are typically latched with a minimum of three latches at the bottom of the nacelle. Latch handles secure the fan cowl during flight. If left unlatched, fan cowls may depart the aircraft during flight.

SUMMARY

A latch handle arrangement is disclosed, comprising a latch handle body comprising a first sidewall, a second sidewall, and a transverse wall extending from the first sidewall to the second sidewall, a first aperture disposed in the first sidewall of the latch handle body, a second aperture disposed in the second sidewall of the latch handle body, and a removable insert coupled to the latch handle body, the removable insert comprising an insert body, a first boss protruding from the insert body into the first aperture, and a second boss protruding from the insert body into the second aperture, wherein the first boss and the second boss are visible from an external surface of the latch handle body.

In various embodiments, the first boss and the second boss are configured to be visible from the external surface in response to the latch handle body moving to an open position.

In various embodiments, the first boss and the second boss are configured to be hidden in response to the latch handle body moving to a closed position.

In various embodiments, the first aperture comprises an aspect ratio of up to 20:1.

In various embodiments, the latch handle body comprises a substantially U-shaped geometry.

In various embodiments, the insert body comprises the substantially U-shaped geometry.

In various embodiments, the latch handle body comprises a first color and the removable insert comprises a second color.

In various embodiments, the first boss is substantially flush with the latch handle body.

In various embodiments, the removable insert is configured to be snap-fit into the latch handle body.

A latch handle arrangement is disclosed, comprising a latch handle body comprising a first sidewall, a second sidewall, and a transverse wall extending from the first sidewall to the second sidewall, a first aperture disposed in the latch handle body, and a removable insert coupled to the latch handle body, the removable insert comprising an insert body and a first boss protruding from the insert body into the first aperture, wherein the first boss is visible from an external surface of the latch handle body.

In various embodiments, the first aperture is disposed in the first sidewall, and the first boss is configured to be visible from the external surface in response to the latch handle body moving to an open position.

In various embodiments, the first aperture is disposed in the first sidewall and the transverse wall.

In various embodiments, the first boss is disposed on a sidewall of the insert body and a transverse wall of the insert body, wherein the first boss wraps around a corner of the insert body.

In various embodiments, the latch handle arrangement further comprises a second aperture disposed in the latch handle body.

In various embodiments, the latch handle arrangement further comprises a second boss protruding from the insert body into the second aperture, wherein the second boss is visible from the external surface of the latch handle body.

In various embodiments, the latch handle body comprises a substantially U-shaped geometry.

In various embodiments, the insert body comprises the substantially U-shaped geometry.

In various embodiments, the first boss is substantially flush with the latch handle body.

A nacelle is disclosed, comprising a first panel, a latch assembly comprising a latch housing and a latch handle arrangement, the latch assembly configured to secure the first panel in a closed position. The latch handle arrangement comprises a latch handle body comprising a first sidewall, a second sidewall, and a transverse wall extending from the first sidewall to the second sidewall, a first aperture disposed in the latch handle body, and a removable insert coupled to the latch handle body, the removable insert comprising an insert body and a first boss protruding from the insert body into the first aperture, wherein the first boss is visible from an external surface of the latch handle body.

In various embodiments, at least a portion of the removable insert is hidden by the panel in response to the latch handle arrangement moving to a locked position.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
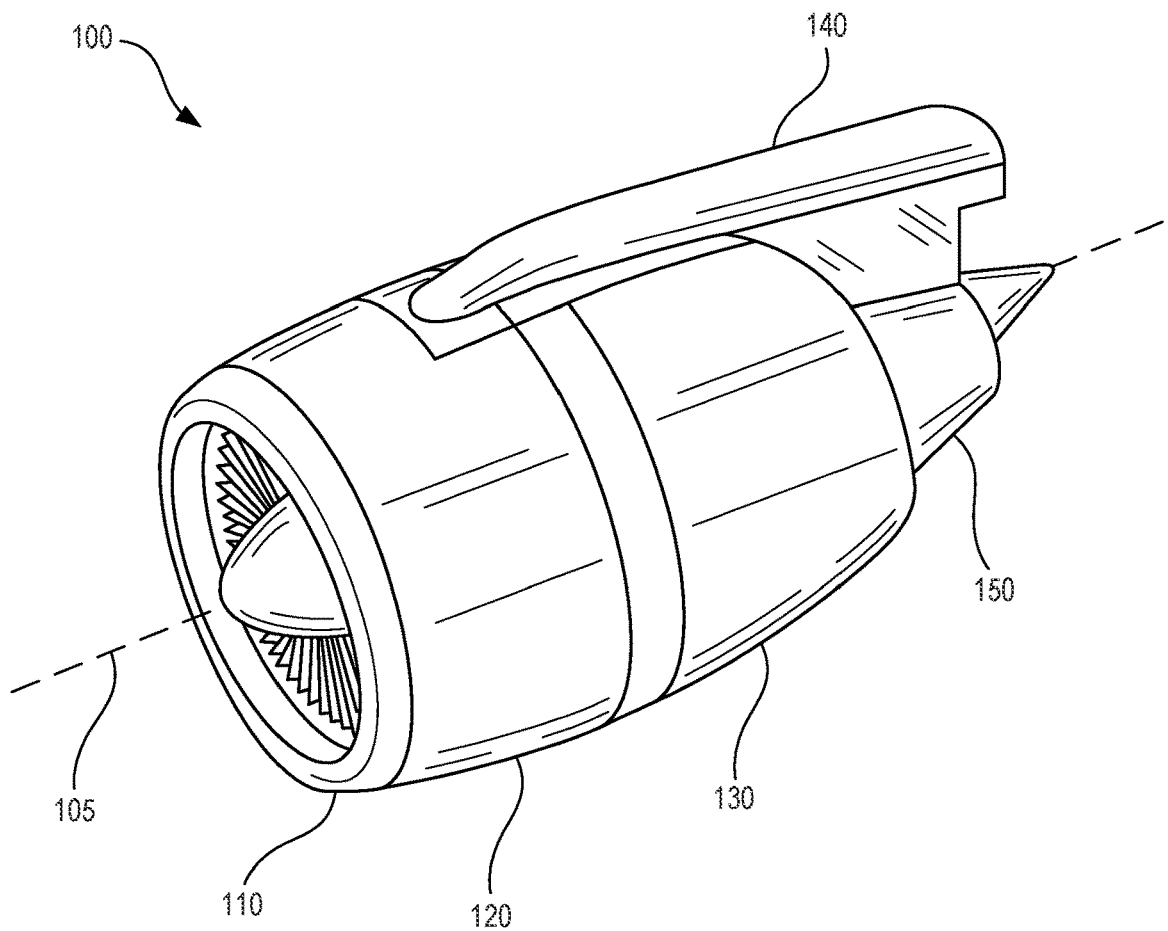
FIG. 1 illustrates a perspective view of a nacelle for an aircraft in accordance with various embodiments.

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, material, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to "without contact" (or similar phrases) may also include reduced contact or minimal contact.

As used herein, "outward" may define an element or portion of an element that is situated radially outer to or away from another, radially inward, element or portion of an element. Thus, an engine core may be situated radially inward of a fan casing, as described herein. As used herein, "inward" may define the element or portion of the element that is situated radially inward in relation to an outward element.

Aircraft fan cowls are often held together with latch assemblies along various axial distances along the fan case. Fan cases may be encased by two fan cowls, which may be joined together with a latch mechanism (e.g., at the bottom of the fan cowls). For example, a fan cowl may include a latch assembly at the bottom of the fan cowl to allow the fan cowl to be hinged open to facilitate access to various fan case components.

It is important that latches be in the closed or locked position prior to take off. If latches are left open, it may result in fan cowl departure during flight. In that regard, it may be advantageous for a latch handle to be highly visible when in the open position.

Accordingly, latch handles may be provided to increase the visibility of the latch handles when the latch handles are in the open position. According to various embodiments, by increasing the visibility of the latch handles, it may be more apparent to ground crews when the latch handles are in the open position, decreasing the chance of a latch handle entering flight in an open position.

Latch handle arrangements of the present disclosure comprise a latch handle body and a removable insert notification feature. Latch handle arrangement of the present disclosure may provide a quick, easy, and convenient way to service a latch handle to replace the notification feature in response to the notification feature becoming worn. For example, a color of the notification feature may begin to fade or the notification feature may be damaged or dirty. The used removable insert may be conveniently removed and replaced, such as via a snap-fit connection, with a new removable insert to quickly replace the used removable insert without having to disassemble the latch assembly.

Referring to FIG. 1, a nacelle 100 for a gas turbine engine is illustrated according to various embodiments. Nacelle 100 may comprise an inlet 110, a fan cowl 120, and a thrust reverser 130. Nacelle 100 may be coupled to a pylon 140, which may mount the nacelle 100 to an aircraft wing or aircraft body. Nacelle 100 may further comprise an exhaust nozzle 150. Nacelle 100 surrounds the engine providing smooth aerodynamic surfaces for airflow around and into the engine. Fan cowl 120 typically comprises two halves. One half may be referred to as a first fan cowl and the other half may be referred to as a second fan cowl. The first fan cowl and second fan cowl are typically hinged to the pylon or to a frame structure attached at the top of nacelle 100. The nacelle 100 may be disposed about a centerline 105, which may also be the axis of rotation of an engine located within the nacelle 100.

Figure 2:
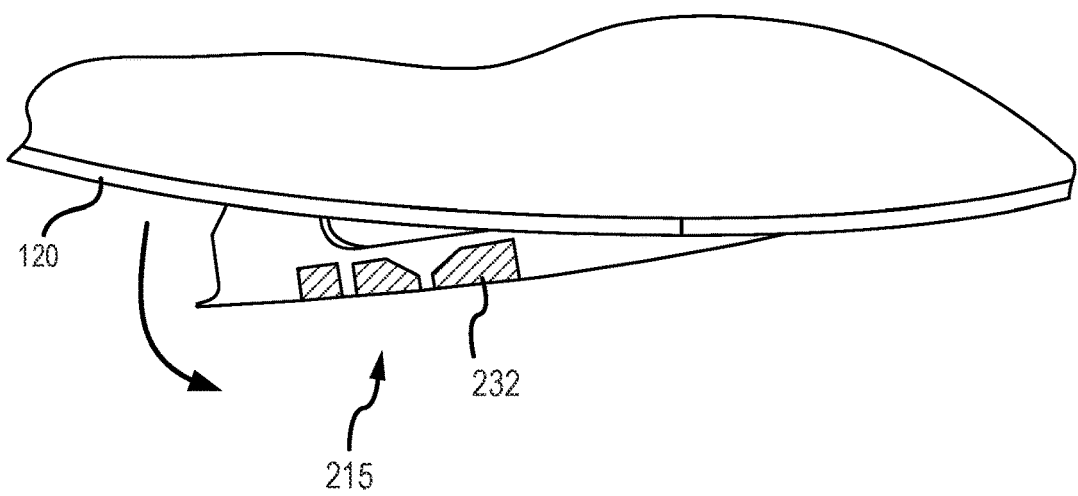
FIG. 2 illustrates a perspective view of a portion of a nacelle for an aircraft with a latch handle rotated towards an open position, in accordance with various embodiments.

With reference to FIG. 2, and with continuing reference to FIG. 1, a front view of a portion of an engine nacelle with a fan cowl latch handle rotated towards an open position is provided. According to various embodiments, latch handle 215 may be included at the bottom of nacelle 100. A sidewall of latch handle 215 may be visible when in the open position. Latch handle 215 may include a notification feature 232 which may tend to visually draw attention from ground crew to indicate that latch handle 215 is not secured in a fully closed position. In various embodiments, any portion of notification feature 232 disposed on the sidewall of latch handle 215 may be covered or hidden in response to the latch handle moving to a closed position. Conversely, any portion of notification feature 232 disposed on the sidewall of latch handle 215 may become visible in response to the latch handle moving to an open position.

Figure 3:
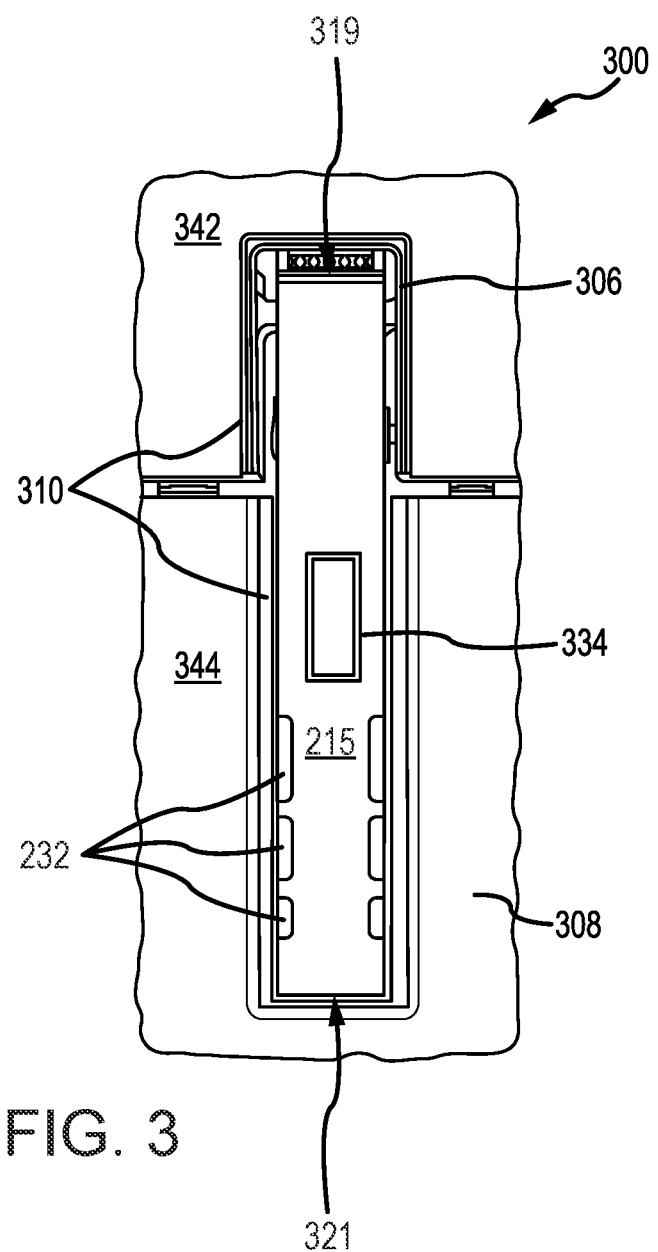
FIG. 3 illustrates an outward view of a latch handle assembly on a nacelle, wherein the latch handle assembly comprises a latch handle comprising a notification feature, in accordance with various embodiments.

Latch assemblies typically comprise a latch hook and a latch keeper, wherein the latch hook is actuated by a latch handle located on a flow surface (e.g., an outward portion of the nacelle). Accordingly, in response to the handle being operated, the latch keeper disengages from the latch hook, allowing access to the oil tank, full authority digital engine control (FADEC) box, and other fan case components. With reference to FIG. 3, an outward view of a latch handle assembly 300 on a nacelle is provided. According to various embodiments, latch handle assembly 300 may include latch housing 310 and latch handle 215. Latch housing 310 may include a first half 306 and a second half 308. First half 306 of latch housing 310 may be referred to as a keeper housing. First half 306 of latch housing 310 may be attached to a first cowl 342 according to various embodiments. Second half 308 of latch housing 310 may be attached to a second cowl 344 according to various embodiments. According to various embodiments, first cowl 342 may be a first fan cowl. According to various embodiments, second cowl 344 may be a second fan cowl.

According to various embodiments, latch handle 215 may include a first end 319 and a second end 321. First end 319 may be rotatable coupled to first half 306 of latch housing 310. In this regard, second end 321 may rotate away from second cowl 344 in response to latch handle 215 rotating to an open position. According to various embodiments, latch housing 310 may be configured to enclose at least a portion of latch handle 215 such that the outward surface of latch housing 310 and the outward surface of latch handle 215 are substantially flush relative to each other when in the closed position. In this manner, latch handle assembly 300 may be aerodynamically efficient.

According to various embodiments, latch handle 215 may include aperture 334. Aperture 334 may be disposed on latch handle 215 in order to facilitate the opening of latch handle 215. Typically, the opening of latch handle 215 from the closed position is facilitated by inserting an object into aperture 334 to depress a release member which may partially release latch handle 215 from latch housing 310. The latch handle 215 may then be further opened by prying latch handle 215 open. However, latch handle arrangements of the present disclosure may be configured to be opened via any suitable method without departing from the scope of the present disclosure.

According to various embodiments, latch handle 215 includes notification feature 232 disposed at the side surface and/or the outward surface of latch handle 215. Notification feature 232 may visually draw attention from ground crew, particularly when latch handle 215 is in the open position. According to various embodiments, notification feature 232 may comprise a removable insert disposed in latch handle 215, as described in further detail herein.

Figure 4A:
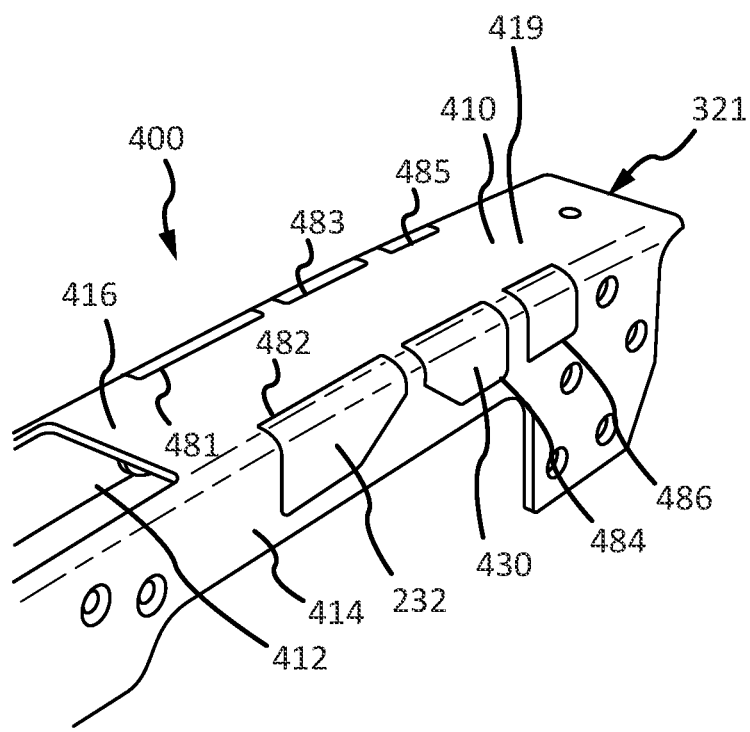
FIG. 4A, FIG. 4B, and FIG. 4C illustrate a latch handle arrangement comprising a latch handle body and a removable insert notification feature, in accordance with various embodiments.
Figure 4B:
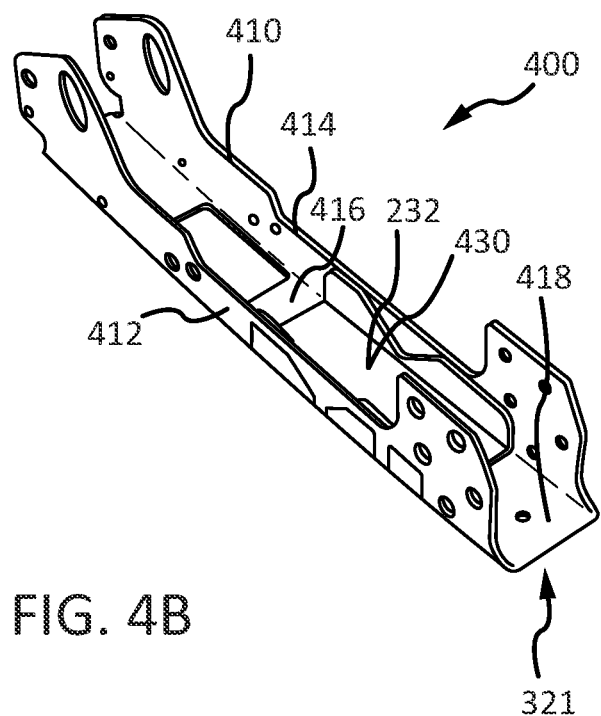
Figure 4C:
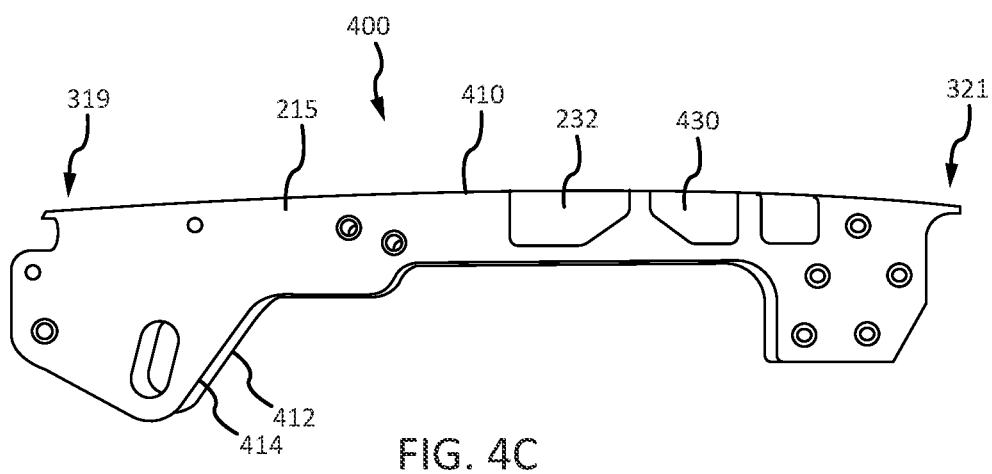

With combined reference to FIG. 4A, FIG. 4B, and FIG. 4C, a latch handle arrangement 400 is illustrated, in accordance with various embodiments. Latch handle arrangement 400 comprises a latch handle body 410 and a removable insert 430. Removable insert 430 may be snap-fit to latch handle body 410 by pushing the interlocking components of the removable insert 430 and latch handle body 410 together, as described herein. In this regard, removable insert 430 may be sufficiently flexible for snap-fit installation to latch handle body 410. Furthermore, it is contemplated herein that, in addition to or in place of the snap-fit connection, removable insert 430 may be fastened to the latch handle body 410. Removable insert 430 may be installed onto an internal surface 418 of latch handle body 410. In various embodiments, removable insert 430 comprises a plastic material. In various embodiments, removable insert 430 comprises a metal material.

Latch handle body 410 generally comprises a first sidewall 412, a second sidewall 414, and a transverse wall 416 extending from the first sidewall 412 to the second sidewall 414. One or more apertures are disposed in latch handle body 410 for accommodating removable insert 430. Furthermore, the removable insert 430 may be visible via the one or more apertures. The illustrated embodiment depicts apertures 481, 482, 483, 484, 485, 486 disposed in the latch handle body 410. However, any number of apertures may be disposed in the latch handle body 410 without departing from the scope of the present disclosure. In various embodiments, at least one aperture is disposed on each side of the latch handle so that, in response to latch handle body 410 being rotated to an open or partially open position, the removable insert 430 is visible from either side of latch handle body 410, thereby visually drawing attention from ground crew from both sides of the latch handle body 410.

Figure 5A:
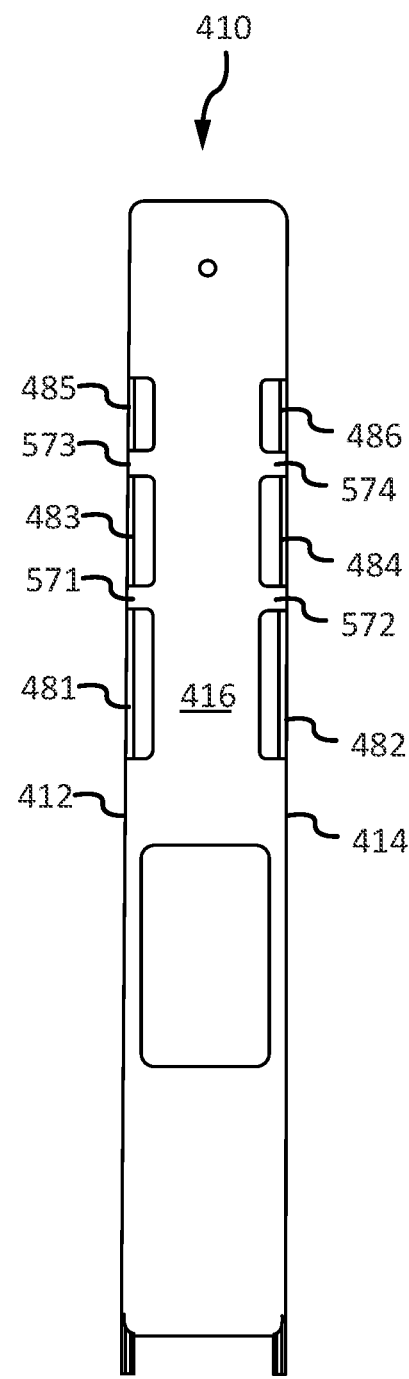
FIG. 5A, FIG. 5B, and FIG. 5C illustrate the latch handle body, in accordance with various embodiments.
Figure 5B:
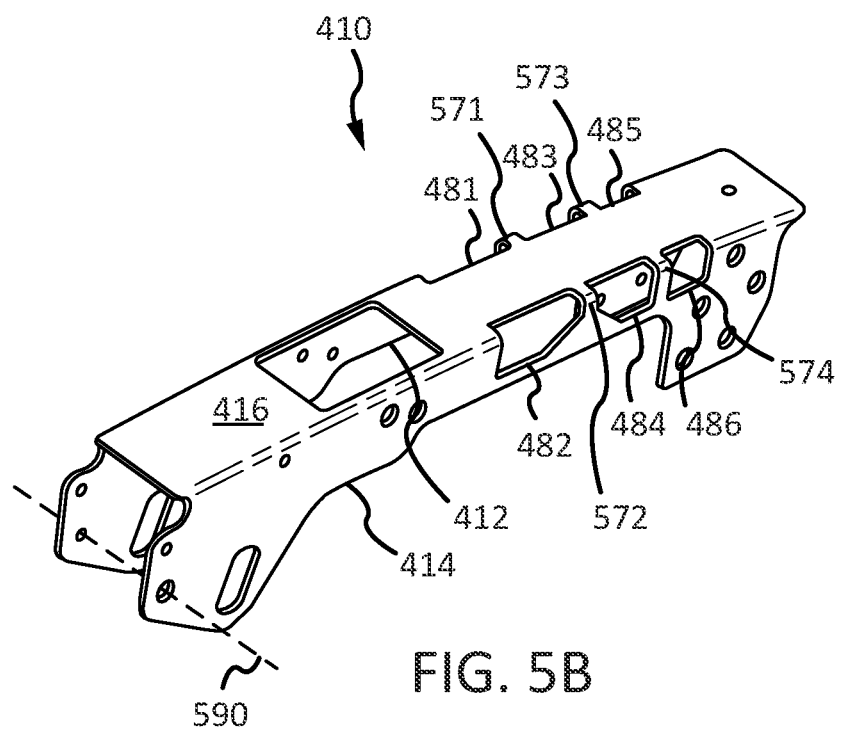
Figure 5C:
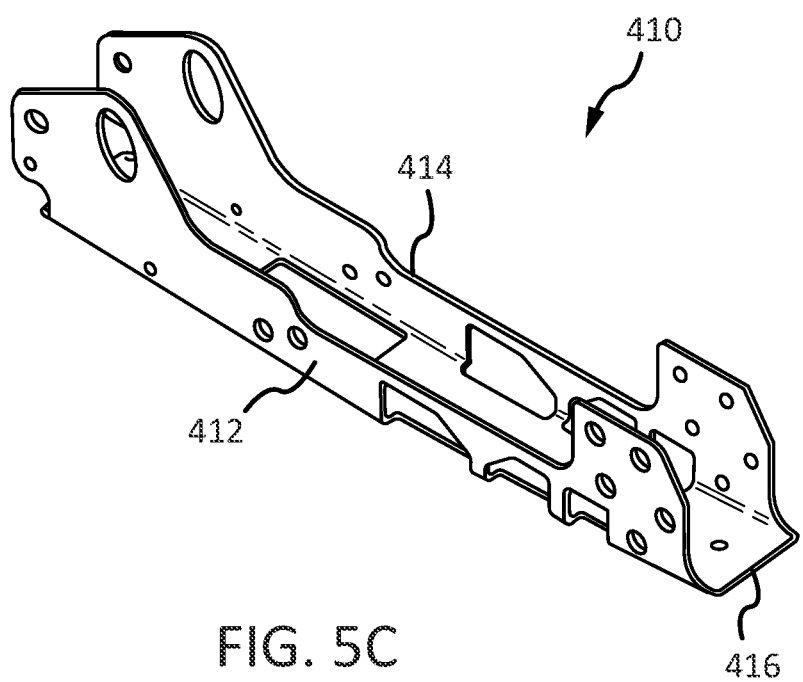

With reference to FIG. 5A, FIG. 5B, and FIG. 5C, the latch handle body 410 is illustrated without a removable insert. In various embodiments, latch handle body 410 may comprise one or more ribs extending from one of the sidewalls 412, 414 to the transverse wall 416. For example, a rib 571 may extend from sidewall 412 to transverse wall 416. Rib 571 may bend at a ninety degree angle, comprising a first portion extending parallel to sidewall 412 and a second portion extending parallel to transverse wall 416. Rib 571 may partially define aperture 481 and partially define aperture 483. In various embodiments, latch handle body 410 comprises rib 573 similarly extending from sidewall 412 and transverse wall 416 and partially defining aperture 483 and aperture 485. Latch handle body 410 may similarly comprise rib 572 and/or rib 574 extending from sidewall 414 to transverse wall 416. In various embodiments, ribs 571, 573 generally mirror ribs 572, 574. Latch handle body 410 may be configured to rotate about axis 590 with respect to a latch handle housing and/or a panel such as a fan cowl.

With combined reference to FIG. 6A, FIG. 6B, FIG. 6C, and FIG. 6D, the removable insert 430 is illustrated, in accordance with various embodiments. Removable insert 430 generally comprises an insert body 640 and at least one boss (e.g., boss 641, boss 642, boss 643, boss 644, boss 645, and/or boss 646) protruding from the insert body 640. Each boss may protrude from the insert body 640 into an associated aperture. For example, with momentary additional reference to FIG. 4A, boss 642 may protrude into aperture 482, wherein boss 642 is visible from an external surface of the latch handle body 410. In various embodiments, boss 642 may be substantially flush with latch handle body 410 in the installed position, as illustrated in FIG. 4A. In various embodiments, boss 642 may be substantially flush with an external surface 419 of latch handle body 410 in the installed position, as illustrated in FIG. 4A. However, in various embodiments, boss 642 may be recessed within latch handle body 410. Still further, in various embodiments, boss 642 may be slightly protruding from latch handle body 410. In various embodiments, each boss is separate and distinct from the other boss(es). Stated differently, boss 641 may be spaced apart from boss 643, boss 642, etc.

Figure 6A:
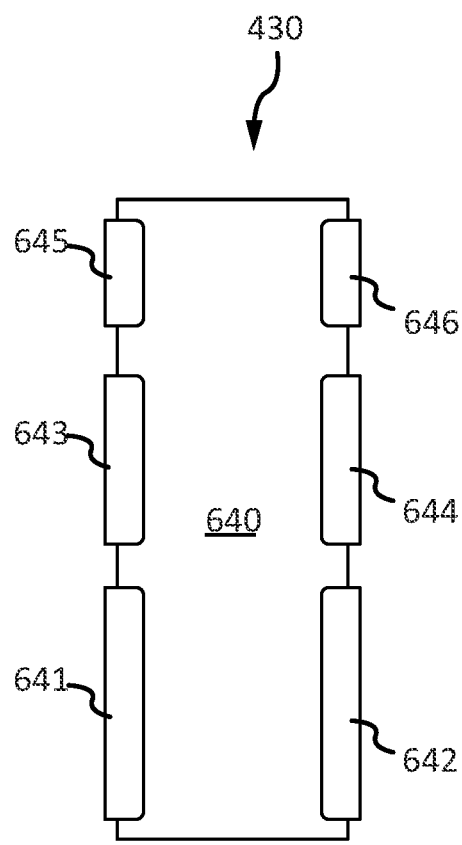
FIG. 6A, FIG. 6B, FIG. 6C, and FIG. 6D illustrate top, isometric, front, and side views, respectively, of the removable insert notification feature, in accordance with various embodiments.
Figure 6B:
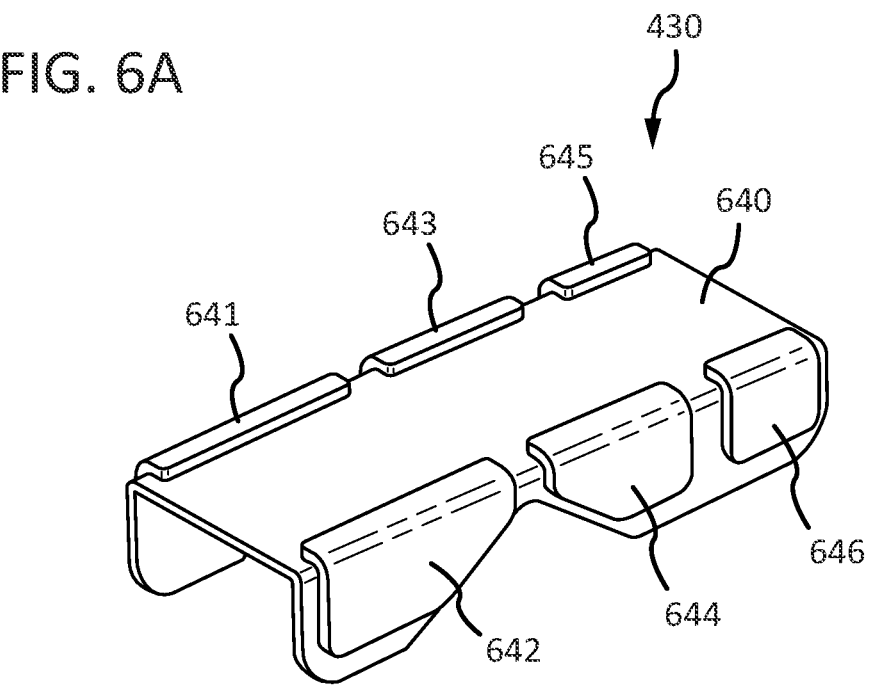
Figure 6C:
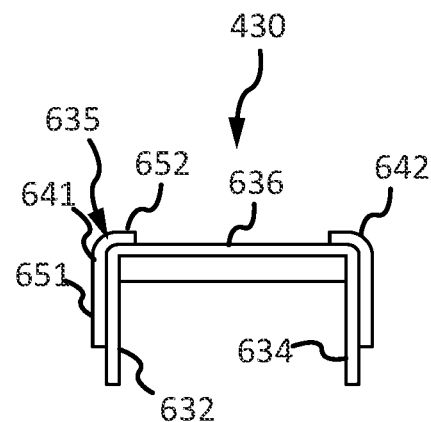
Figure 6D:
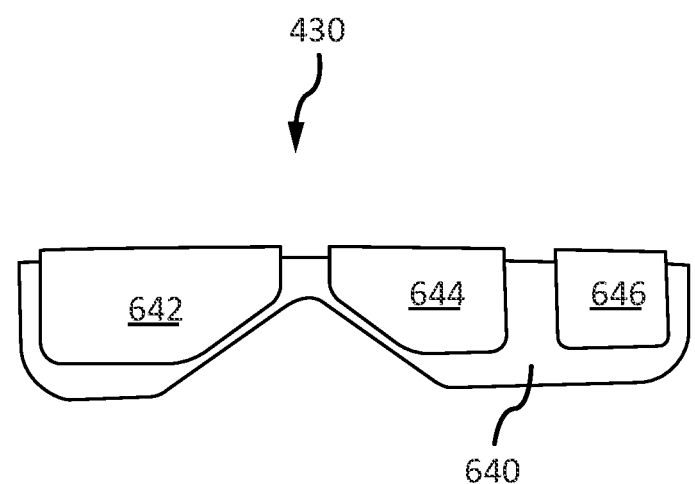

With particular focus on FIG. 6C, boss 641 may comprise a first portion 651 disposed on a first sidewall 632 of the insert body 640 and a second portion 652 disposed on a transverse wall 636 of the insert body 640, wherein the boss 641 wraps around a corner 635 of the insert body 640. In this manner, the removable insert 430 may be viewed from a top of the latch handle, as well as the sides of the latch handle. Boss 642 may be formed similar to boss 641. With momentary reference to FIG. 5B, apertures disposed in latch handle body 410 may be sized to correspond to the geometry of the bosses of removable insert 430. Thus, aperture 482 may be partially disposed in sidewall 414 and partially disposed in transverse wall 416. In various embodiments, boss 642 substantially fills aperture 482. Likewise, the other apertures in latch handle body 410 may be sized and positioned to correspond to the size and position of the other boss features of removable insert 430.

Removable insert 430 may comprise a substantially "U"-shaped geometry as illustrated in FIG. 6C. As the removable insert 430 snap-fits into latch handle body 410 (see FIG. 4B) latch handle body 410 may similarly comprise a substantially "U"-shaped geometry.

According to various embodiments, removable insert 430 may include text or characters which may visually alert ground crew. According to various embodiments, removable insert 430 may comprise a bright paint, coating, or any other form of colored surface such that there is substantial contrast between removable insert 430 and the rest of the latch handle assembly and/or nacelle assembly. According to various embodiments, removable insert 430 is made from a material that comprises a bright colored surface such that there is substantial contrast between removable insert 430 and the rest of the latch handle assembly and/or nacelle assembly. Latch handle body 410 may comprise a first color, such as grey, black, silver, or any other color. Removable insert 430 may comprise a second color, such as orange, red, or any other color. The second color may be more bright than the first color to draw attention from ground grey when removable insert 430 is visible. According to various embodiments, removable insert 430 may comprise a reflective surface such as a reflective tape, a reflective sticker, or any other form of reflective surface which may increase the visibility of the outward surface of removable insert 430.

Figure 7:
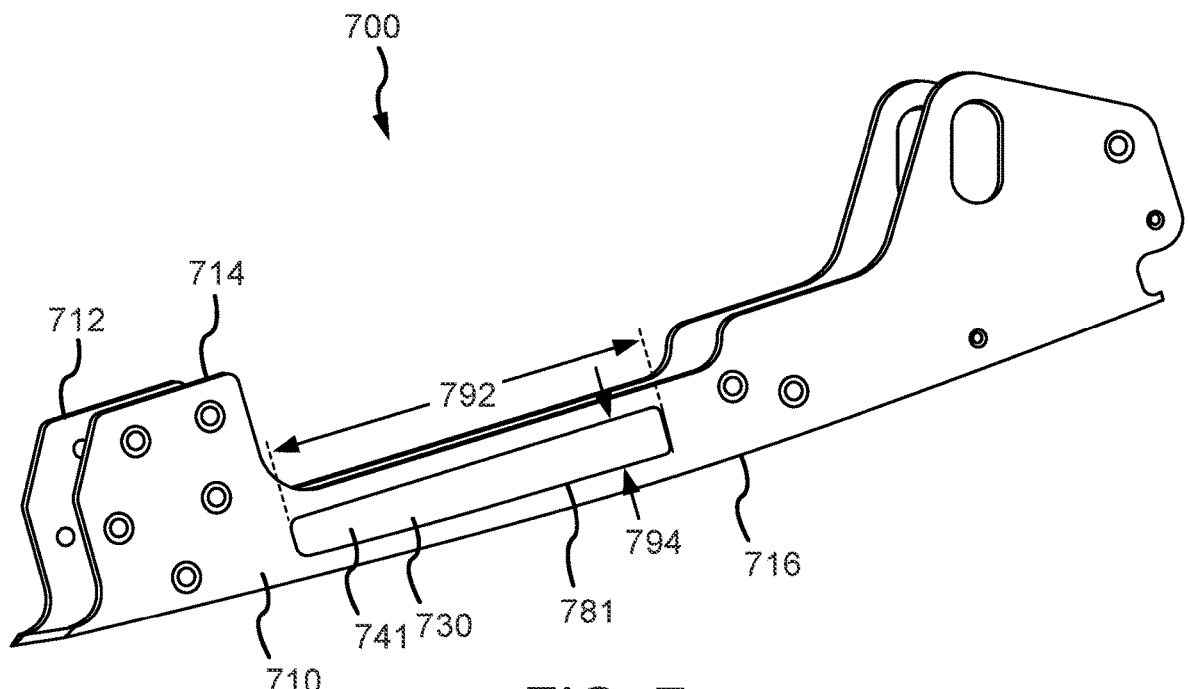
FIG. 7 illustrates a latch handle arrangement comprising a latch handle body and a removable insert notification feature, in accordance with various embodiments.
Figure 8:
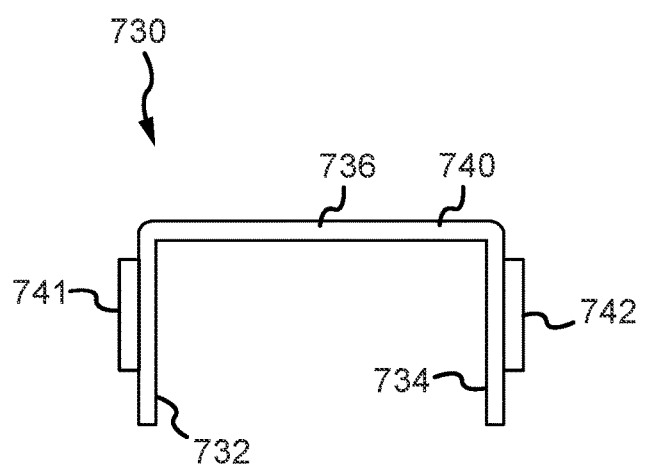
FIG. 8 illustrates the removable insert notification feature of FIG. 7, in accordance with various embodiments.

With reference to FIG. 7 and FIG. 8, a latch handle arrangement 700 is illustrated, in accordance with various embodiments. Latch handle arrangement 700 comprises a latch handle body 710 and a removable insert 730. Latch handle arrangement 700 may be similar to latch handle arrangement 400 of FIG. 4A except that removable insert 730 is only visible from the sidewalls 712, 714 of latch handle body 710. In this regard, latch handle body 710 may comprise an aperture 781 disposed in sidewall 714. A second, similar, aperture may also be disposed in sidewall 712. Removable insert 730 may snap-fit into aperture 781. Removable insert 730 may comprise an insert body 740 and a first boss 741 protruding from insert body 740. Removable insert 730 may further comprise a second boss 742 protruding from insert body 740. Insert body 740 may comprise a transverse wall 736, a first sidewall 732, and a second sidewall 734. First boss 741 may be disposed on first sidewall 732. Second boss 742 may be disposed on second sidewall 734.

In accordance with various embodiments, first boss 741 may comprise a high aspect ratio. In various embodiments, first boss 741 comprises an aspect ratio of between 2:1 and 30:1, wherein the aspect ratio, as used herein, is a ratio of the maximum length 792 to the maximum width 794. In various embodiments, first boss 741 comprises an aspect ratio of between 2:1 and 20:1. In various embodiments, first boss 741 comprises an aspect ratio of between 4:1 and 20:1. In various embodiments, first boss 741 comprises an aspect ratio of between 6:1 and 20:1. In various embodiments, first boss 741 comprises an aspect ratio of up to 20:1.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosed embodiments. The scope of the claimed embodiments is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to invoke 35 U.S.C. § 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

We claim:

1. A latch handle arrangement comprising:
a latch handle body comprising a first sidewall, a second sidewall, and a transverse wall extending from the first sidewall to the second sidewall;
a first aperture disposed in the first sidewall of the latch handle body;
a second aperture disposed in the second sidewall of the latch handle body; and
a removable insert coupled to the latch handle body, the removable insert comprising an insert body, a first boss protruding from the insert body into the first aperture, and a second boss protruding from the insert body into the second aperture, wherein the first boss and the second boss are visible from an external surface of the latch handle body; and
wherein the insert body, the first boss, and the second boss are formed as a single piece.

2. The latch handle arrangement of claim 1, wherein the first boss and the second boss are configured to be visible from the external surface in response to the latch handle body moving to an open position.

3. The latch handle arrangement of claim 2, wherein the first boss and the second boss are configured to be hidden in response to the latch handle body moving to a closed position.

4. The latch handle arrangement of claim 1, wherein the first aperture comprises an aspect ratio of up to 20:1.

5. The latch handle arrangement of claim 1, wherein the latch handle body comprises a substantially U-shaped geometry.

6. The latch handle arrangement of claim 5, wherein the insert body comprises the substantially U-shaped geometry.

7. The latch handle arrangement of claim 1, wherein the latch handle body comprises a first color and the removable insert comprises a second color.

8. The latch handle arrangement of claim 1, wherein the first boss is substantially flush with the latch handle body.

9. The latch handle arrangement of claim 1, wherein the removable insert is configured to be snap-fit into the latch handle body.

10. A latch handle arrangement comprising:
- a latch handle body comprising a first sidewall, a second sidewall, and a transverse wall extending from the first sidewall to the second sidewall;
- a first aperture disposed in the latch handle body and extending between and to an internal surface of the latch handle body and an external surface of the latch handle body; and
- a removable insert coupled to the latch handle body, the removable insert comprising an insert body and a first boss protruding from the insert body into the first aperture, wherein the first boss is visible from the external surface of the latch handle body, and wherein the first boss is substantially flush with the latch handle body; and
- wherein the insert body and the first boss are formed as a single piece.

11. The latch handle arrangement of claim 10, wherein the first aperture is disposed in the first sidewall, and the first boss is configured to be visible from the external surface in response to the latch handle body moving to an open position.

12. The latch handle arrangement of claim 10, wherein the first aperture is disposed in the first sidewall and the transverse wall.

13. The latch handle arrangement of claim 12, wherein the first boss is disposed on a sidewall of the insert body and the transverse wall of the insert body, wherein the first boss wraps around a corner of the insert body.

14. The latch handle arrangement of claim 10, further comprising a second aperture disposed in the latch handle body.

15. The latch handle arrangement of claim 14, further comprising a second boss protruding from the insert body into the second aperture, wherein the second boss is visible from the external surface of the latch handle body.

16. The latch handle arrangement of claim 10, wherein the latch handle body comprises a substantially U-shaped geometry.

17. The latch handle arrangement of claim 16, wherein the insert body comprises the substantially U-shaped geometry.

18. A nacelle comprising:
- a first panel;
- a latch assembly comprising a latch housing and a latch handle arrangement, the latch assembly configured to secure the first panel in a closed position,
- wherein the latch handle arrangement comprises:
- a latch handle body comprising a first sidewall, a second sidewall, and a transverse wall extending from the first sidewall to the second sidewall;
- a first aperture disposed in the latch handle body; and
- a removable insert coupled to the latch handle body, the removable insert comprising an insert body and a first boss protruding from the insert body into the first aperture, wherein the first boss is visible from an external surface of the latch handle body, and wherein at least a portion of the removable insert is hidden by the first panel in response to the latch handle arrangement moving to a locked position; and
- wherein the insert body and the first boss are formed as a single piece.

\* \* \* \* \*